United States Patent [19]
Quatse et al.

[11] Patent Number: 5,991,368
[45] Date of Patent: Nov. 23, 1999

[54] CUSTOMER INFORMATION ANNOUNCEMENT SERVICE

[75] Inventors: Gina Quatse, Freehold; William Henry Stenger, Sr., Marlboro, both of N.J.

[73] Assignee: AT&T Corp., New York, N.Y.

[21] Appl. No.: 08/869,805

[22] Filed: Jun. 5, 1997

[51] Int. Cl.$^6$ .................................................. H04M 1/64
[52] U.S. Cl. ........................................ 379/88.25; 379/211
[58] Field of Search ............................... 379/67.1, 88.22, 379/88.23, 88.25, 210, 211, 212, 213

[56] References Cited

U.S. PATENT DOCUMENTS

| | | | |
|---|---|---|---|
| 4,602,129 | 7/1986 | Matthews et al. | 379/88.26 |
| 4,811,382 | 3/1989 | Sleevi | 379/88.25 |
| 5,440,615 | 8/1995 | Caccuro et al. | 379/88.05 |
| 5,675,634 | 10/1997 | Park | 379/88.16 |
| 5,832,061 | 11/1998 | Rubin | 379/88.09 |

OTHER PUBLICATIONS

"Method for Informing Callers of Forwarded Telephone", IBM Technical Disclosure Bulletin, vol. 36, No. 10, Oct. 1993.

"New Area Codes in North and Central New Jersey To Take Effect on Jun. 1, Customers Should Begin Using the New 973 and 732 Area Code", PR Newswire Association Inc., May 28, 1997.

*Primary Examiner*—Fan S. Tsang

[57] ABSTRACT

A method for notifying customers, using customer information announcements, of a change in their telephone numbers due to an area code split and for notifying callers of such customers of the new telephone numbers. In one aspect, customer information is announced during completion of a telephone call placed by a calling party to a called party. A telephone number of the called party is received at a telecommunications network from the calling party. A first message indicating that the telephone number of the called party will be changed is sent to the calling party from the telecommunications network and the call is connected to the received telephone number, if the telephone number of the called party will be changed in the future. A message indicating that the telephone number of the called party has been changed is sent to the calling party from the telecommunications network and the call is forwarded to a new telephone number, if the telephone number of the called party has been changed. Customer information is announced during completion of a telephone call placed by a calling party to a called party. A telephone number of the calling party is received at a telecommunications network. A message indicating that the telephone number of the calling party will be changed is sent to the calling party from the telecommunications network, if the telephone number of the called party will be changed in the future.

39 Claims, 3 Drawing Sheets

5,991,368

CUSTOMER INFORMATION ANNOUNCEMENT SERVICE

FIELD OF THE INVENTION

The present invention relates to telecommunications services, and more particularly to announcing information to telecommunications network customers.

BACKGROUND OF THE INVENTION

The recent increase in telecommunications network connected devices, such as FAX machines, pagers and personal computer modems has increasingly lead to telephone number exhaustion. Telephone number exhaustion occurs when substantially all of the telephone numbers in a given numbering plan area (NPA), also known as area code, have been assigned to active customers and are no longer available to new customers. Local telephone operating companies, known as Local Exchange Carriers (LECs) deal with telephone number exhaustion by assigning new area codes to existing customers, effectively "splitting" an area code. At present, over 75 area codes have been split and some have been split twice. This phenomenon is occurring not only in the United States, but in other countries as well.

When an area code is split, some of the existing customers in the area code are assigned to a new area code. These reassigned customers are given a new telephone number, which consists of the new area code, followed by the customer's existing three digit exchange code and four digit subscriber code. Callers who dial a customer's telephone number after the split occurs receive a message indicating only that the call can not be completed. No announcement of the split is provided and the call is not completed. This causes inconvenience to callers, who cannot complete their calls, and to called parties, who miss the calls that were not completed. It also causes lost revenue to telephone carriers, which incur call setup expenses, but cannot charge for uncompleted calls. A more effective caller notification technique is needed.

Customers whose telephone numbers will change due to an area code split may inform potential callers of the change in advance of the split. Currently, customers are notified via the telephone bill and by television, radio and newspaper advertisements. Often customers fail to communicate such notification because time has elapsed and they simply forget about it. A more effective customer notification technique is needed.

SUMMARY OF THE INVENTION

The present invention is a method for notifying customers, using customer information announcements, of a change in their telephone numbers due to an area code split and for notifying callers of such customers of the new telephone numbers.

In one aspect of the method of the present invention, customer information is announced during completion of a telephone call placed by a calling party to a called party. A telephone number of the called party is received at a telecommunications network from the calling party. A first message indicating that the telephone number of the called party will be changed is sent to the calling party from the telecommunications network and the call is connected to the received telephone number, if the telephone number of the called party will be changed in the future.

In another aspect of the method of the present invention, a message indicating that the telephone number of the called party has been changed is sent to the calling party from the telecommunications network and the call is forwarded to a new telephone number, if the telephone number of the called party has been changed.

In another aspect of the method of the present invention, customer information is announced during completion of a telephone call placed by a calling party to a called party. A telephone number of the calling party is received at a telecommunications network. A message indicating that the telephone number of the calling party will be changed is sent to the calling party from the telecommunications network, if the telephone number of the called party will be changed in the future.

BRIEF DESCRIPTION OF THE DRAWINGS the details of the present invention, both as to its structure and operation, can best be understood by referring to the accompanying drawings, in which like reference numbers and designations refer to like elements.

DETAILED DESCRIPTION OF THE INVENTION

Figure 1:
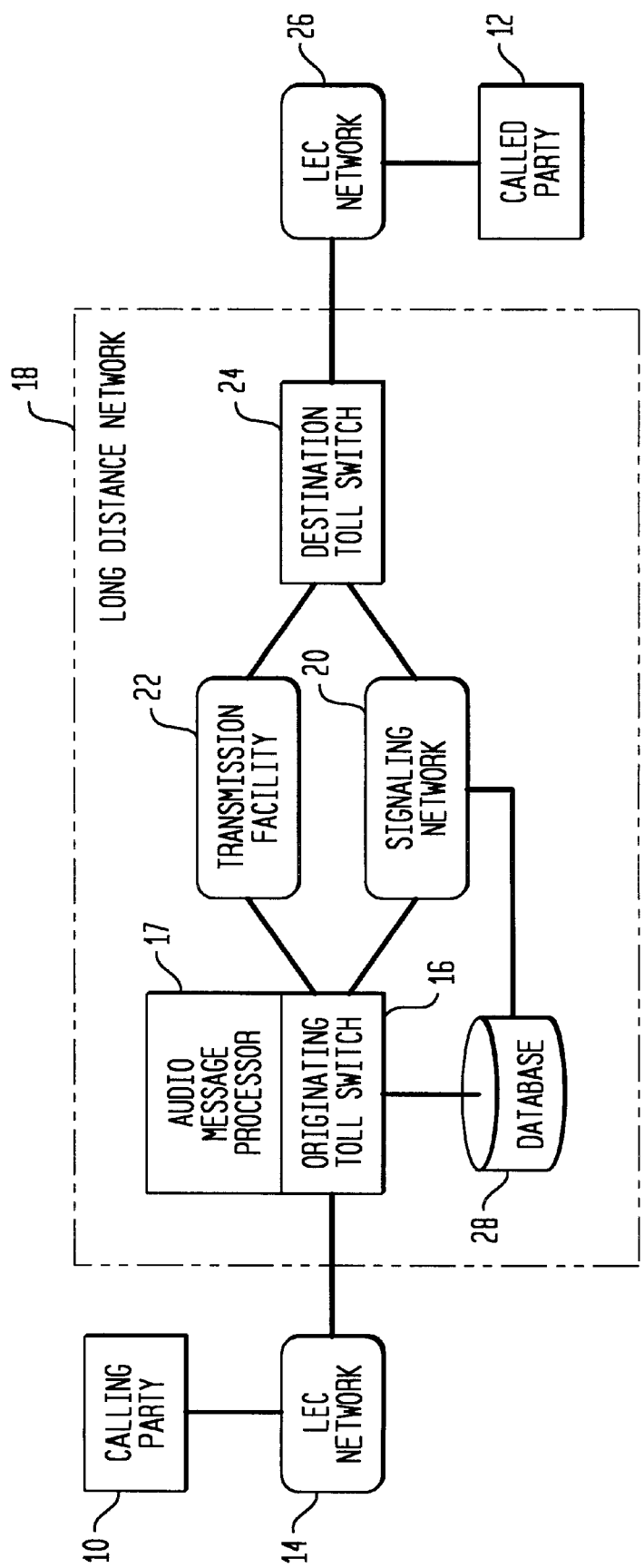
FIG. 1 is a block diagram of an exemplary telephone network which provides information announcements according to the present invention.

An example of the present invention involving an illustrative telephone call made by a calling party 10 to a called party 12. The telephone call is made through an illustrative telephone network comprising a local telephone network 14 provided by a local exchange carrier (LEC), such as one of the regional Bell Operating Companies (RBOCs). The network 14 connects the calling party 10 to an originating toll switch 16, which includes or is connected to audio message processor 17, located in a long distance network 18, provided by an interexchange carrier, such as AT&T. Audio message processor 17 allows audio messages to be generated and played to one or both parties to a call connected to toll switch 16.

In addition to toll switch 16, the long distance network 18 comprises a signaling network 20, which receives the telephone number of the called from the calling party 10 and creates an appropriate connection between parties 10 and 12 through the appropriate transmission facilities 22 in long distance network 18. A telephone call made by the calling party 10 is directed to a destination toll switch 24 and then to called party 12 through an LEC 26 that is local to the called party. Although not shown in FIG. 1, networks 14 and 26 may have respective signaling networks create a path through appropriate transmission facilities to effectuate their respective parts of the connection between the parties 10 and 12.

Long distance network 18 also includes database 28, which is communicatively coupled to originating toll switch 16. Database 28 may be implemented as separate from toll switch 16, as shown in FIG. 1. In this embodiment, switch 16 accesses database 28 either directly or through signaling network 20. Database 28 may also be implemented as a part of toll switch 16. Database 20 is accessed by originating switch 16 to determine whether a telephone number received by switch 16 has been changed due to an area code split.

The calling party 10 initiates a long-distance telephone call by dialing the telephone number of the called party 12. In this example of the invention, the calling party 10 first dials a digit or series of digits, such as "1", signifying that the telephone call is a long distance call. The calling party 10 next dials a series of digits representing the numbering plan area (NPA), also known as the area code. In one embodiment of the present invention, the dialed area code is used to create an appropriate audio message to be played to the calling party. The calling party 10 finally dials a series of digits, uniquely identifying the called party 12, after the area code has been dialed. In response to the calling party 10 dialing the telephone number of the called party 12, the telephone network shown in FIG. 1 sets up a connection between the calling party 10 and the called party 12 to effectuate a telephone call between those two parties.

Figure 2:
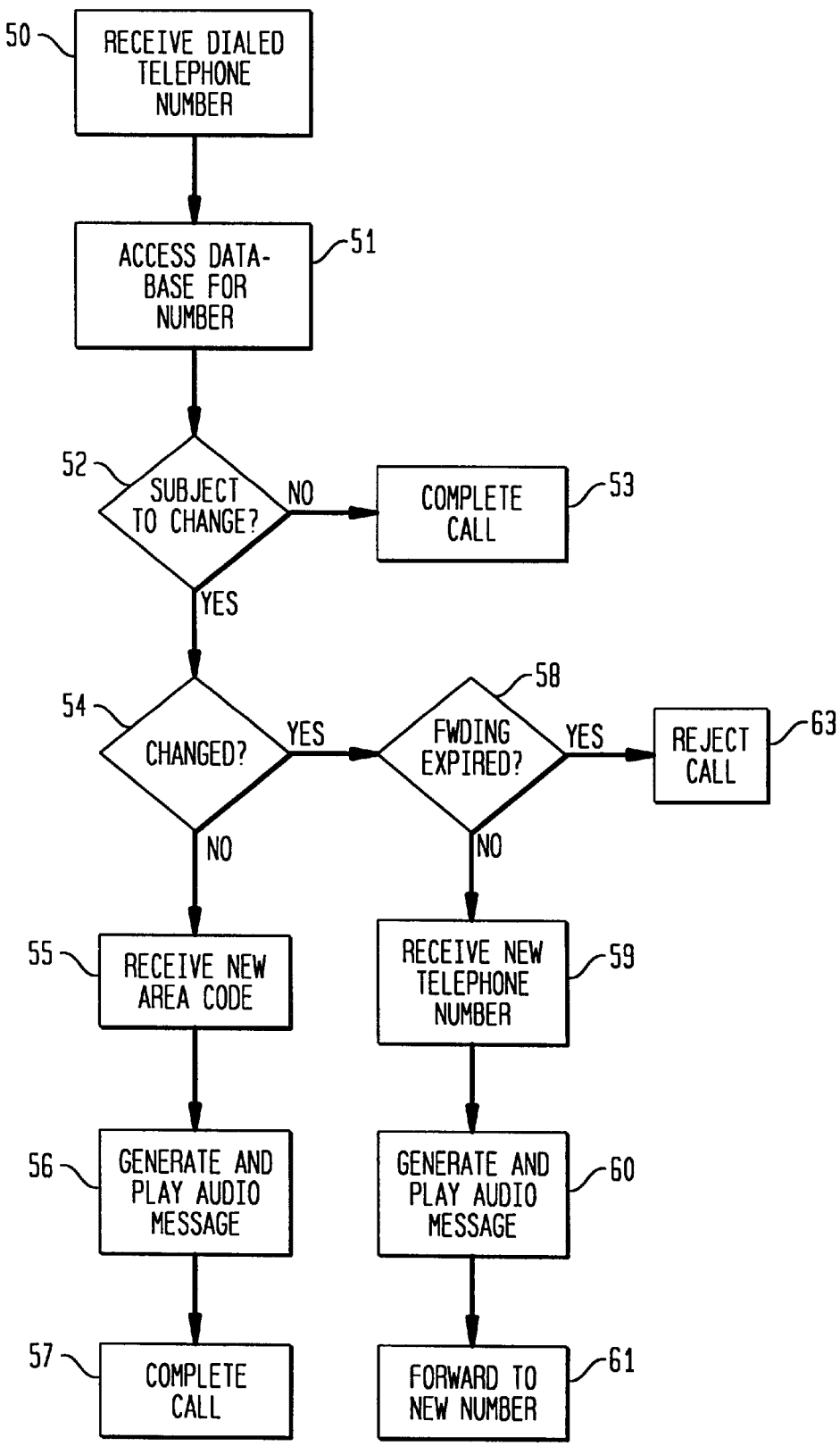
FIG. 2 is a flow diagram of a calling party information announcement process, according to the present invention.

FIG. 2 is a flow diagram of a calling party information announcement process, according to the present invention. It is best viewed in conjunction with FIG. 1. In this process, called party 12 is the party whose telephone number is affected by the area code split. The process begins with step 50, in which originating toll switch 16 receives a telephone number dialed by calling party 10. The dialed number is originally received by LEC network 14, which transmits the number to switch 16. In step 51, database 28 is accessed using the dialed telephone number and the corresponding database record is extracted. In one embodiment, the extracted database record is transmitted to toll switch 16, and steps 52, 54 and 58 are performed by switch 16. In another embodiment, steps 52, 54 and 58 are performed by database 28 and the results transmitted to switch 16.

In step 52, it is determined whether the dialed telephone numbs will be or has been changed. If no database record corresponding to the dialed telephone number was found in step 51, then the dialed telephone number is not subject to change. If the dialed telephone number is not subject to change, then in step 53, the call is completed conventionally.

If the dialed telephone number is subject to change, then in step 54, it is determined whether the telephone number has actually been changed. If so, then in step 55, switch 16 receives the new area code and transmits it to audio message processor 17. In step 56, audio message processor 17 generates and plays an audio message informing the caller of the impending area code split. For example, if the dialed number was in the 908 area code and is being changed to the 732 area code, the following exemplary message would be generated:

"You have dialed 908-555-1234. In March, the 908 area code will change to 732. Please make a note of it."

In step 57, the call is completed.

If the dialed telephone number has been changed, then calls cannot be completed to it directly. In step 58, it is determined whether forwarding to the new number has expired. If so, the call cannot be completed at all and in step 63 the call is rejected, with the appropriate message or tone. If not, then in step 59, switch 16 receives the new telephone number, to which the call is to be connected. In step 60, audio call processor 17 generates and plays an audio message. For example, if the dialed number was in the 908 area code and has been changed to the 732 area code, the following exemplary message would be generated:

"You have dialed 908-555-1234. This number has been changed. The new number is 732-555-1234. Please make a note of it. Your call will now be automatically forwarded to the new number."

In step 61, the call is forwarded to the new number.

Figure 3:
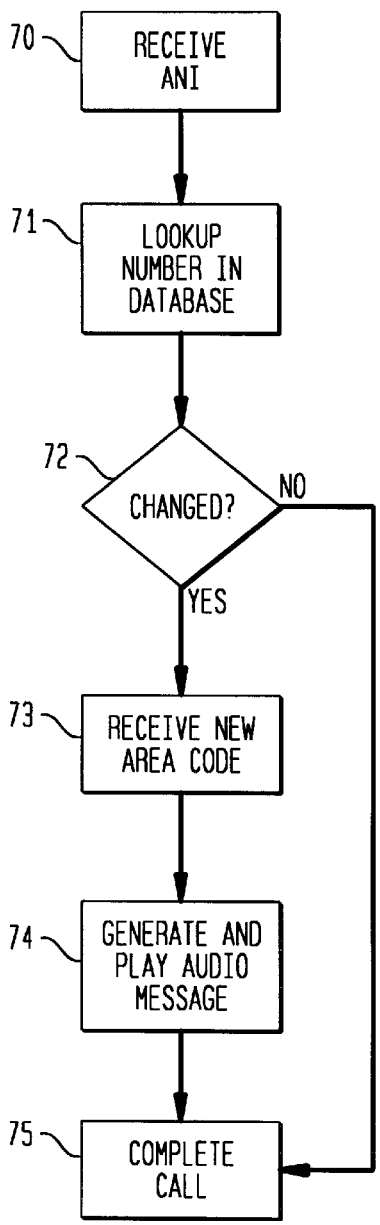
FIG. 3 is a flow diagram of a customer information announcement process, according to the present invention.

FIG. 3 is a flow diagram of a customer information announcement process, according to the present invention. It is best viewed in conjunction with FIG. 1. In this process, calling party 10 is the party whose telephone number is affected by the area code split. The process begins with step 70, in which originating toll switch 16 receives an automatic number identifier (ANI) identifying the telephone number of calling party 10. The ANI is generated by LEC network 14, which transmits the ANI to switch 16. In step 71, database 28 is accessed using the calling party telephone number and the corresponding database record is extracted. In one embodiment, the extracted database record is transmitted to toll switch 16, and step 72 is performed by switch 16. In another embodiment, step 72 is performed by database 28 and the results transmitted to switch 16.

In step 72, it is determined whether the calling party telephone number will be changed. If no database record corresponding to the calling party telephone number was found in step 71, then the calling party telephone number is not subject to change. If the calling party telephone number is not subject to change, then in step 53, the call is completed conventionally.

If the calling party telephone number is subject to change, then in step 73 switch 16 receives the new area code and transmits it to audio message processor 17. In step 74, audio message processor 17 generates and plays an audio message informing the calling party of the impending area code split. For example, if the calling party's telephone number was in the 908 area code and is being changed to the 732 area code, the following exemplary message would be generated:

"Your area code is due to change to 732 in March. Please remind your friends of this change."

In step 75, the call is completed.

Figure 4:
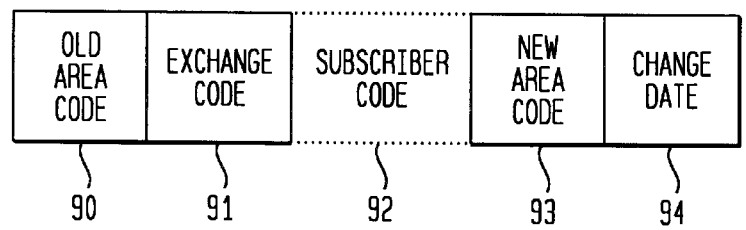
FIG. 4 is an exemplary format of a database record used in the telephone network of FIG. 1.

FIG. 4 is an exemplary format of a record included in database 28. The record includes an old area code field 90, an exchange code field 91, an optional subscriber code field 92, a new area code field 93, and a change date field 94. Old area code field 90, exchange code field 91 and optionally, subscriber code field 92 are used to select the appropriate record in database 28. Typically, entire exchanges are transferred from an old area code to a new area code. In the above mentioned step 52 of FIG. 2 or step 72 of FIG. 3, the area code and exchange code of the received dialed number or calling party number are compared to the old area code field 90 and the exchange code field 91, respectively. If a matching record is found, the telephone number has been or is to be transferred to a new area code.

It may be that only a portion of the customers in a particular exchange are to be transferred to a new area code. In this case, the subscriber code of the received dialed number or ANI may be compared to the subscriber code field 92.

When it is determined that the received dialed number or ANI is to be transferred to a new area code, the new area code is indicated by the new area code field 93. Change date field 94 indicates the date that the telephone number will change. If the change date is in the future at the time the record is accessed, then the telephone number will be changed. If the change date has passed at the time the record is accessed, then the telephone number has been changed. If the change date has passed by more than a predetermined amount of time, depending upon the Local Exchange Company's reuse strategy, typically 30 days, then the forwarding period has expired.

Additional features may be added to enchance the user-friendliness of the present invention. For example, the steps in FIGS. 2 and 3 in which audio messages are generated and played may be modified to include interactive user sessions. The caller may be given the opportunity to select a language in which the audio message will be played. The caller may be allowed to control the playing of the message. For example, entry of a control code, such as "3", may cause the playing of the message to be canceled. Entry of a control code, such as "5", during the playing of the message, may cause playing of the message to be suspended. Entry of a control code, such as "7", may cause additional information to be given to the caller. For example, the caller may be prompted to enter another area code to receive an additional message including information relating to future planned split activity involving the entered area code. Finally, entry of a control code, such as "9", may cause the audio message to be repeated.

Although specific embodiments of the present invention have been described, it will be understood by those of skill in the art that there are other embodiments which are equivalent to the described embodiments. Accordingly, it is to be understood that the invention is not to be limited by the specific illustrated embodiments, but only by the scope of the appended claims.

What is claimed is:

1. A method of announcing customer information during completion of a telephone call placed by a calling party to a called party, comprising the steps of:
   receiving at a telecommunications network a telephone number of the called party from the calling party;
   sending a first message to the calling party from the telecommunications network, the first message indicating that the telephone number of the called party will be changed, if the telephone number of the called party is scheduled to change, but has not yet changed
   connecting the call to the received telephone number, if the telephone number of the called party is scheduled to change, but has not yet changed; and
   sending a second message to the calling party from the telecommunications network, the second message indicating that the telephone number of the called party has been changed, if the telephone number of the called party has been changed.

2. The method of claim 1, wherein the first message or second message indicates that the telephone number of the called party will be changed because of an area code split.

3. The method of claim 2, wherein the step of sending a first message to the calling party comprises the step of:
   playing an audio announcement to the calling party, the audio announcement comprising a new area code.

4. The method of claim 3, wherein the audio announcement further comprises a date that the telephone number of the called party is scheduled to change.

5. The method of claim 3, wherein the step of playing the audio announcement comprises the step of:
   allowing the calling party to select a language in which the audio announcement is played.

6. The method of claim 3, wherein the step of playing the audio announcement comprises the step of:
   allowing the calling party to cancel playing of the audio announcement.

7. The method of claim 3, wherein the step of playing the audio announcement comprises the step of:
   allowing the calling party to suspend playing of the audio announcement.

8. The method of claim 3, wherein the step of playing the audio announcement comprises the step of:
   allowing the calling party to repeat playing of the audio announcement.

9. The method of claim 3, wherein the step of playing the audio announcement comprises the step of:
   allowing the calling party to select additional information to be sent to the calling party.

10. The method of claim 2, further comprising the step of:
    forwarding the call to a new telephone number, if the telephone number of the called party has been changed.

11. The method of claim 10, wherein the first message or second message indicates that the telephone number of the called party will be changed or has been changed because of an area code split.

12. The method of claim 11, wherein the step of sending a second message to the calling party comprises the step of:
    playing an audio announcement to the calling party, the audio announcement comprising a new area code to which the telephone number of the called party has been changed.

13. A method of announcing customer information during completion of a telephone call placed by a calling party to a called party, comprising the steps of:
    receiving at a telecommunications network a telephone number of the called party from the calling party;
    determining a date on which the telephone number of the called party will be changed;
    sending a first message to the calling party from the telecommunications network and connecting the call to the received telephone number, the first message indicating that the telephone number of the called party will be changed, if the date on which the telephone number of the called party will be changed has not passed; and
    sending a second message to the calling party from the telecommunications network and forwarding the call to a new telephone number, the second message indicating that the telephone number of the called party has been changed, if the date on which the telephone number of the called party will be changed has passed.

14. The method of claim 13, wherein the telephone number of the called party has been changed because of an area code split.

15. The method of claim 14, wherein the step of sending a message to the calling party comprises the step of:
    playing an audio announcement to the calling party, the audio announcement comprising a new area code to which the telephone number of the called party has been changed.

16. The method of claim 15, wherein the step of playing the audio announcement comprises the step of:
    allowing the calling party to select a language in which the audio announcement is played.

17. The method of claim 15, wherein the step of playing the audio announcement comprises the step of:
    allowing the calling party to cancel playing of the audio announcement.

18. The method of claim 15, wherein the step of playing the audio announcement comprises the step of:
    allowing the calling party to suspend playing of the audio announcement.

19. The method of claim 15, wherein the step of playing the audio announcement comprises the step of:
    allowing the calling party to repeat playing of the audio announcement.

20. An apparatus in a telecommunications network for announcing customer information during completion of a telephone call placed by a calling party to a called party, comprising the steps of:

means for receiving a telephone number of the called party;

means for sending a first message to the calling party, the first message indicating that the telephone number of the called party will be changed, if the telephone number of the called party is scheduled to change, but has not yet changed;

means for connecting the call to the received telephone number, if the telephone number of the called party is scheduled to change, but has not yet changed; and means for sending a second message to the calling party, the second message indicating that the telephone number of the called party has been changed, if the telephone number of the called party has been changed.

21. The apparatus of claim 20, wherein the first message or second message indicates that the telephone number of the called party will be changed because of an area code split.

22. The apparatus of claim 21, wherein the means for sending a first message comprises:

means for playing an audio announcement to the calling party, the audio announcement comprising a new area code.

23. The apparatus of claim 22, wherein the audio announcement further comprises a date that the telephone number of the called party is scheduled to change.

24. The apparatus of claim 22, wherein the means for playing an audio announcement comprises:

means for allowing the calling party to select a language in which the audio announcement is played.

25. The apparatus of claim 22, wherein the means for playing the audio announcement comprises:

means for allowing the calling party to cancel playing of the audio announcement.

26. The apparatus of claim 22, wherein the means for playing the audio announcement comprises:

means for allowing the calling party to suspend playing of the audio announcement.

27. The apparatus of claim 22, wherein the means for playing the audio announcement comprises:

means for allowing the calling party to repeat playing of the audio announcement.

28. The apparatus of claim 22, wherein the means for playing the audio announcement comprises:

means for allowing the calling party to select additional information to be sent to the calling party.

29. The apparatus of claim 20, further comprising:

means for forwarding the call to a new telephone number, if the telephone number of the called party has been changed.

30. The apparatus of claim 29, wherein the first message or second message indicates that the telephone number of the called party will be changed or has been changed because of an area code split.

31. The apparatus of claim 30, wherein the means for sending a second message to the calling party comprises:

means for playing an audio announcement to the calling party, the audio announcement comprising a new area code to which the telephone number of the called party has been changed.

32. An apparatus in a telecommunications network for announcing customer information during completion of a telephone call placed by a calling party to a called party, comprising:

means for receiving a telephone number of the called party;

means for determining a date on which the telephone number of the called party will be changed;

means for sending a first message to the calling party from the telecommunications network and connecting the call to the received telephone number, the first message indicating that the telephone number of the called party will be changed, if the date on which the telephone number of the called party will be changed has not passed; and means for sending a second message to the calling party and forwarding the call to a new telephone number, the second message indicating that the telephone number of the called party has been changed, if the date on which the telephone number of the called party will be changed has passed.

33. The apparatus of claim 32, wherein the telephone number of the called party has been changed because of an area code split.

34. The apparatus of claim 33, wherein the means for sending a message to the calling party comprises:

means for playing an audio announcement to the calling party, the audio announcement comprising a new area code to which the telephone number of the called party has been changed.

35. The apparatus of claim 34, wherein the means for playing the audio announcement comprises:

means for allowing the calling party to select a language in which the audio announcement is played.

36. The apparatus of claim 34, wherein the means for playing the audio announcement comprises:

means for allowing the calling party to cancel playing of the audio announcement.

37. The apparatus of claim 34, wherein the means for playing the audio announcement comprises:

means for allowing the calling party to suspend playing of the audio announcement.

38. The apparatus of claim 34, wherein the means for playing the audio announcement comprises:

means for allowing the calling party to repeat playing of the audio announcement.

39. The apparatus of claim 34, wherein the means for playing the audio announcement comprises:

means for allowing the calling party to select additional information to be sent to the calling party.

* * * * *